(12) United States Patent
Baldwin

(10) Patent No.: US 12,046,884 B1
(45) Date of Patent: Jul. 23, 2024

(54) SNAP IN ZIP CONNECTOR

(71) Applicant: Jeffrey P. Baldwin, Anthem, AZ (US)

(72) Inventor: Jeffrey P. Baldwin, Anthem, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 0 days.

(21) Appl. No.: 18/458,660

(22) Filed: Aug. 30, 2023

Related U.S. Application Data

(63) Continuation of application No. 17/895,985, filed on Aug. 25, 2022, now Pat. No. 11,777,288, which is a continuation of application No. 17/211,763, filed on Mar. 24, 2021, now Pat. No. 11,456,582.

(60) Provisional application No. 62/993,774, filed on Mar. 24, 2020.

(51) Int. Cl.
*H02G 3/04* (2006.01)
*F16L 3/10* (2006.01)
*H02G 3/08* (2006.01)

(52) U.S. Cl.
CPC .......... *H02G 3/0456* (2013.01); *F16L 3/1091* (2013.01); *H02G 3/08* (2013.01)

(58) Field of Classification Search
CPC .......... H02G 3/0456; H02G 3/04; H02G 3/08; H02G 3/06; H02G 3/0616; H02G 3/081; H02G 3/083; F16L 3/1091; F16L 3/08; F16L 3/10; F16L 3/1016; F16L 3/1025
See application file for complete search history.

(56) References Cited

U.S. PATENT DOCUMENTS

| | | | |
|---|---|---|---|
| 1,776,652 A | 9/1930 | Clayton | |
| 6,352,439 B1 | 3/2002 | Stark | |
| 7,390,980 B1 | 6/2008 | Gretz | |
| 8,690,194 B1* | 4/2014 | Smith | F16L 25/01 285/154.4 |
| 8,791,374 B1* | 7/2014 | Smith | H02G 3/0616 174/530 |
| 10,601,189 B1 | 3/2020 | Smith | |
| 2005/0006535 A1* | 1/2005 | Brown | H02G 3/32 248/70 |
| 2008/0246279 A1 | 10/2008 | van Walraven | |
| 2014/0346291 A1* | 11/2014 | Booth | H02G 3/32 248/74.4 |
| 2018/0216754 A1* | 8/2018 | Ciasulli | F16L 3/1016 |
| 2018/0266587 A1* | 9/2018 | Booth | F16L 3/1075 |
| 2021/0384714 A1* | 12/2021 | Yang | H02G 3/083 |

* cited by examiner

*Primary Examiner* — Hoa C Nguyen
*Assistant Examiner* — Amol H Patel
(74) *Attorney, Agent, or Firm* — Booth Udall Fuller, PLC; Kenneth C. Booth

(57) ABSTRACT

A snap-in zip connector with a clamp for gripping a wire between a first bracket and a second bracket. The first bracket includes a clamp seat and a first fastener opening formed by an elongated slot and hole joined together and extending through the clamp seat. The second bracket includes a fastener opening that aligns with the hole. An insert positioned in the elongated slot includes a spring arm extending into the circular hole extend into the circular hole that engages a threaded shaft of the fastener to restrict removal except through rotation of the at least one fastener.

20 Claims, 16 Drawing Sheets

SNAP IN ZIP CONNECTOR

CROSS REFERENCE TO RELATED APPLICATIONS

This application is a continuation of U.S. Utility patent application Ser. No. 17/895,985 entitled "Snap In Zip Connector" to Baldwin filed on Aug. 25, 2022, which is a continuation of U.S. Utility patent application Ser. No. 17/211,763 entitled "Snap In Zip Connector" to Baldwin that was filed on Mar. 24, 2021, issued as U.S. Pat. No. 11,456,582 on Sep. 27, 2022, which application claims the benefit of the filing date of U.S. Provisional Patent Application No. 62/993,774 entitled "Snap In Zip Connector" to Baldwin that was filed on Mar. 24, 2020, the disclosures of which are hereby incorporated herein by this reference.

TECHNICAL FIELD

Aspects of this document relate generally to cable connectors, and more specifically to clamp type cable connectors, such as for coupling cable, wiring, conduit, or pipes to an electrical box, housing, or junction box, whether non-metallic or metallic.

BACKGROUND

An electrical box often has a variety of electrical components surrounding the electrical box. For example, electrical wires may extend into the electrical box, providing power to electrical devices within the electrical box, and conduit or pipes may run alongside the electrical box. These components often are secured to the electrical box to provide structure to the components and hold them in place using a cable connector. Because the cable connector may be used to secure wires, as well as pipes or conduit, it is designed to fit a wide range of sizes of electrical components. To accommodate the wide range of sizes, the screws generally have long threaded portions. Therefore, tightening the cable connector around a smaller wire can be tedious and take a large amount of time because all of the thread must rotate through the cable connector.

SUMMARY

Aspects of this document relate to a snap-in zip connector comprising a clamp configured to grip an electrical wire, the clamp may comprise a first bracket member having an upper rim configured to be disposed adjacent to an outer surface of an electrical box, a lower rim configured to be disposed adjacent to an inner surface of the electrical box, a pipe extending between the upper rim and the lower rim and having a sidewall with an opening extending therethrough, and a clamp seat fixedly coupled to the pipe and having a first surface, a second surface opposite the first surface, and at least one first fastener opening extending through the first surface and the second surface and comprising an elongated slot and a circular hole positioned adjacent to each other and joined together to form the at least one first fastener opening, a bracket member positioned adjacent to the first surface of the clamp seat, the second bracket member having at least one second fastener opening extending therethrough, the at least one second fastener opening aligned with the circular hole of the at least one first fastener opening of the clamp seat, at least one fastener extending through the at least one first fastener opening and the at least one second fastener opening and having a threaded shaft, at least one insert positioned within the elongated slot of the first bracket member and extending through the second surface of the clamp seat, the at least one insert having a spring arm on a first side of the at least one insert, the spring arm extending into the circular hole and configured to flex in relation to the at least one fastener inserted into the circular hole, engage with the threaded shaft, and impede the removal of the at least one fastener from the circular hole, and a collar extending around the pipe of the first bracket member and retained on the first bracket member by the upper rim and the lower rim, the collar having at least one tab extending away from the collar, the at least one tab configured to engage with the electrical box to lock the snap-in zip connector to the electrical box.

Particular embodiments may comprise one or more of the following features. The at least one fastener may further have a head with a drive. The at least one insert may further have a stop on a second side of the at least one insert opposite the first side, wherein the stop is configured to contact the second surface of the clamp seat and restrict the at least one insert from completely entering the elongated slot. The at least one first fastener opening and the at least one second fastener opening may be unthreaded. The upper rim may be disposed adjacent the outer surface of the electrical box, the lower rim is disposed adjacent the inner surface of the electrical box, and the at least one tab of the collar is engaged with the electrical box to lock the clamp to the electrical box. The at least one fastener may be two fasteners, the at least one first fastener opening may be two first fastener openings, the at least one second fastener opening may be two second fastener openings, and the at least one insert may be two inserts.

Aspects of this disclosure relate to a snap-in zip connector comprising a clamp configured to grip an electrical wire, the clamp may comprise a first bracket member having a pipe extending between an upper rim and a lower rim and a clamp seat extending from the pipe, the clamp seat comprising a first surface, a second surface opposite the first surface, and at least one first fastener opening extending through the first surface and the second surface, the at least one fastener opening comprising an elongated slot and a hole positioned adjacent to each other and joined together to form the at least one first fastener opening, a second bracket member positioned adjacent to the first surface of the clamp seat, the second bracket member having at least one second fastener opening extending therethrough, the at least one second fastener opening aligned with the hole of the at least one first fastener opening of the clamp seat, at least one fastener extending through the at least one first fastener opening and the at least one second fastener opening and having a threaded shaft, and at least one insert positioned within the elongated slot of the first bracket member and extending through the second surface of the clamp seat, the at least one insert having a spring arm on a first side of the at least one insert, the spring arm extending into the hole and configured to engage with the threaded shaft, and impede the removal of the at least one fastener from the hole.

Particular embodiments may comprise one or more of the following features. The at least one fastener may further have a head with a drive. The at least one insert may further have a stop on a second side of the at least one insert opposite the first side, wherein the stop is configured to contact the second surface of the clamp seat and restrict the at least one insert from completely entering the elongated slot. The at least one first fastener opening and the at least one second fastener opening may be unthreaded. The clamp may further comprise an upper rim configured to be disposed adjacent to an outer surface of an electrical box, a lower rim configured to be disposed adjacent to an inner surface of the electrical box, and a collar extending around the first bracket member and retained on the first bracket member by the upper rim and the lower rim, the collar having at least one tab extending away from the collar, the at least one tab configured to engage with the electrical box to lock the snap in zip connector to the electrical box. The connector may further comprise an electrical box, wherein the upper rim is disposed adjacent the outer surface of the electrical box, the lower rim is disposed adjacent the inner surface of the electrical box, and the at least one tab of the collar is engaged with the electrical box to lock the clamp to the electrical box.

Aspects of the disclosure relate to a snap-in zip connector comprising a clamp configured to grip an electrical wire, the clamp may comprise a first bracket member having a clamp seat and at least one first fastener opening comprising an elongated slot and a hole joined together and extending through the clamp seat to form the at least one first fastener opening, a second bracket member having at least one second fastener opening extending through the second bracket member, the at least one second fastener opening configured to align with the hole of the clamp seat when the second bracket member is seated against the clamp seat, at least one insert configured to be positioned within the elongated slot of the first bracket member through the second surface of the clamp seat, the at least one insert having an arm on a first side of the at least one insert, the arm configured to extend into the hole, and at least one fastener having a threaded shaft, wherein when the at least one fastener is extended through the at least one second fastener opening and the hole of the at least one first fastener opening and engaged by the arm of insert, removal of the at least one fastener from the hole is restricted except through rotation of the at least one fastener.

Particular embodiments may comprise one or more of the following features. The at least one fastener may further have a head with a drive. The at least one insert may further have a stop on a second side of the at least one insert opposite the first side, wherein the stop is configured to contact the second surface of the clamp seat and restrict the at least one insert from completely entering the elongated slot. The at least one first fastener opening and the at least one second fastener opening may be unthreaded. The clamp may further comprise an upper rim configured to be disposed adjacent to an outer surface of an electrical box, a lower rim configured to be disposed adjacent to an inner surface of the electrical box, and a collar extending around the first bracket member and retained on the first bracket member by the upper rim and the lower rim, the collar having at least one tab extending away from the collar, the at least one tab configured to engage with the electrical box to lock the snap in zip connector to the electrical box. The snap-in zip connector may further comprise an electrical box, wherein the upper rim is disposed adjacent the outer surface of the electrical box, the lower rim is disposed adjacent the inner surface of the electrical box, and the at least one tab of the collar is engaged with the electrical box to lock the clamp to the electrical box.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1A:
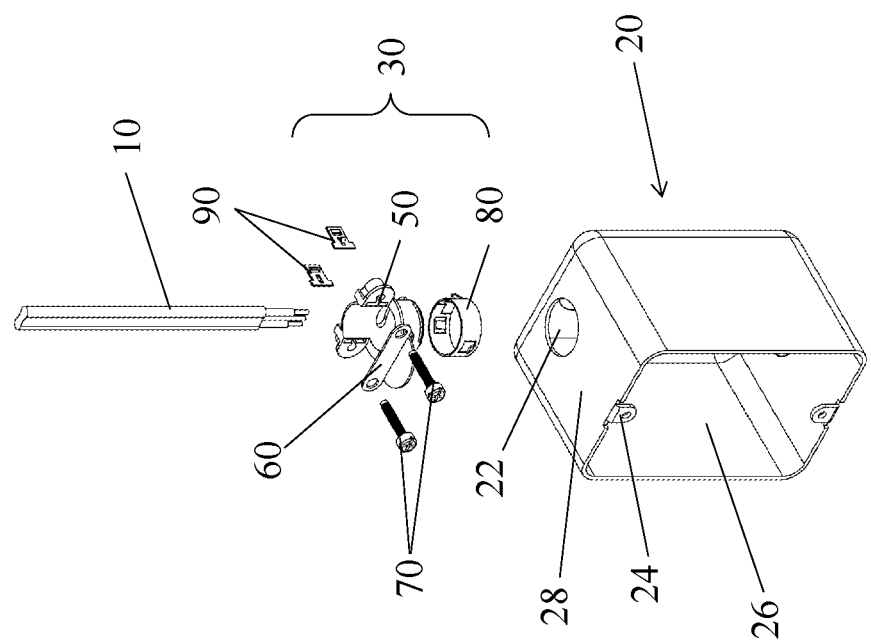
FIG. 1A is a front perspective exploded view of a snap in zip connector with an electrical wire and an electrical box.
Figure 1B:
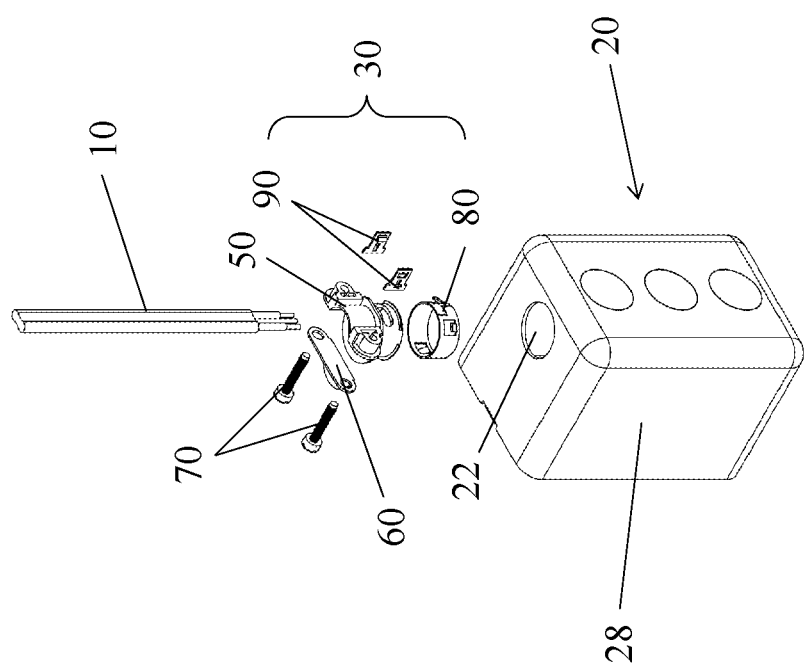
FIG. 1B is back perspective exploded view of the snap in zip connector shown in FIG. 1A.
Figure 2A:
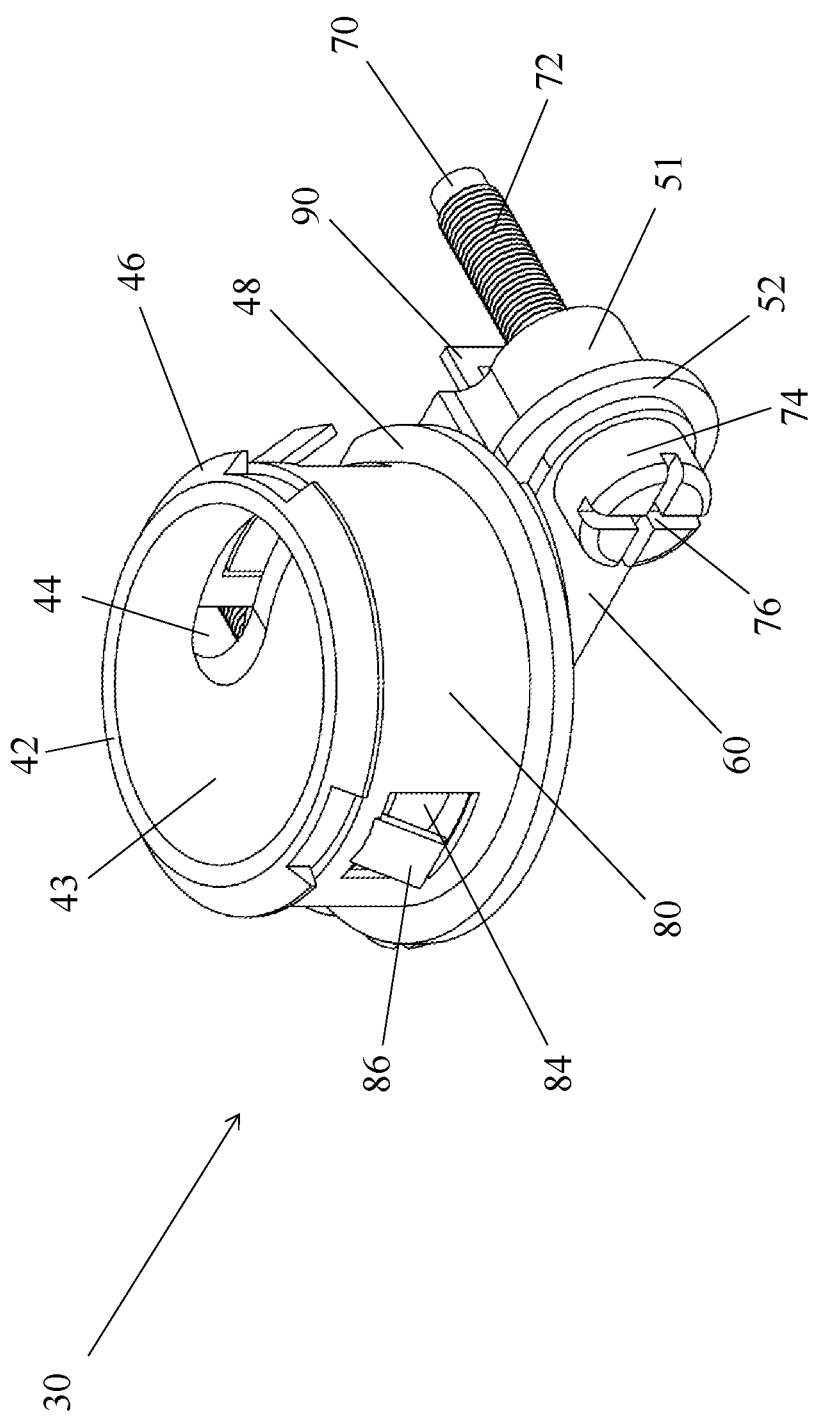
FIG. 2A is a front perspective view of the snap in zip connector shown in FIG. 1A.
Figure 2B:
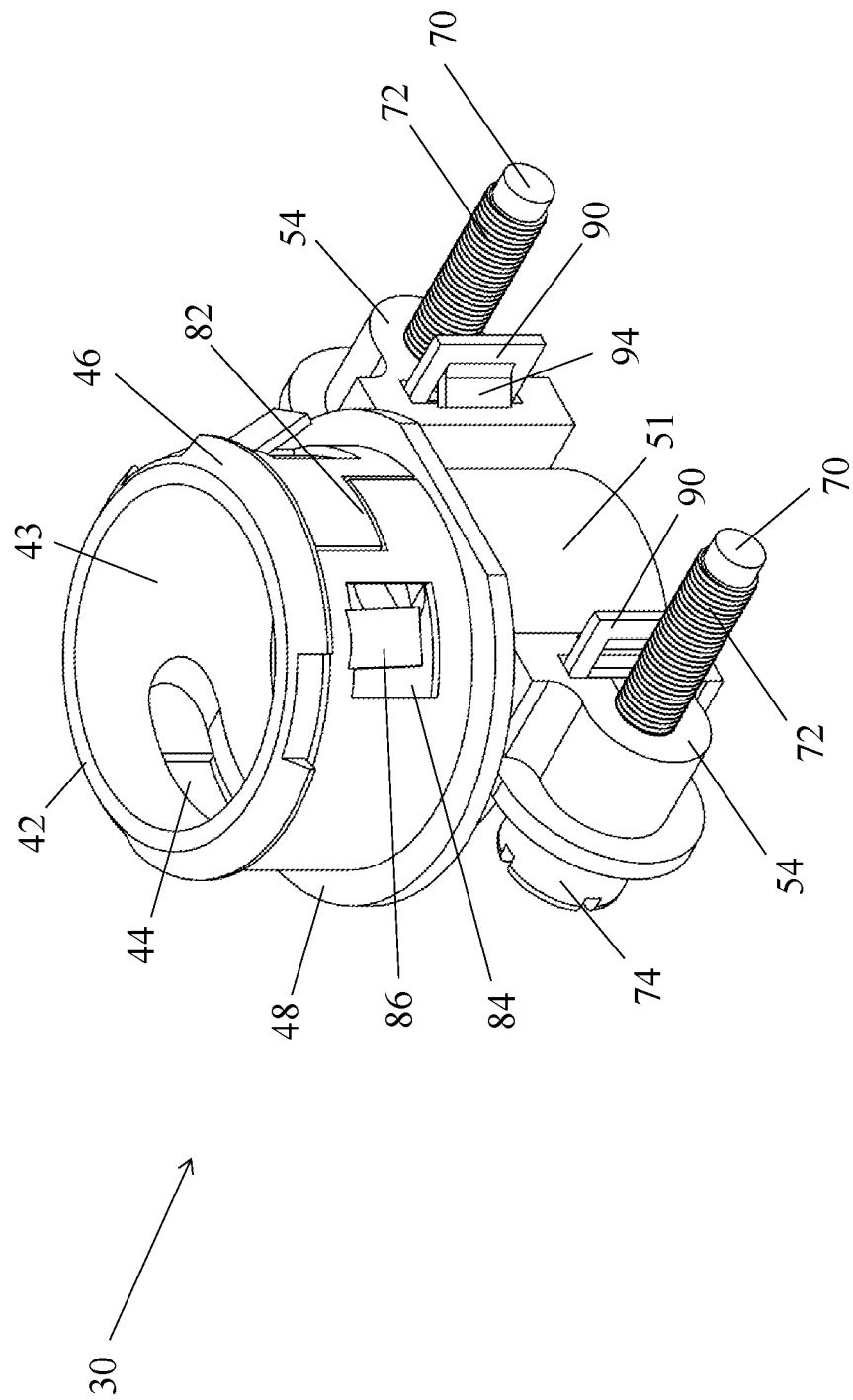
FIG. 2B is a back perspective view of the snap in zip connector shown in FIG. 1A.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure relates to a snap in zip connector 30, which is designed to allow an electrical wire 10 or some other electrical component to be rapidly coupled to an electrical box 20 to protect an electrical connection between the electrical wire 10 and an electrical device coupled to the electrical box 20 through the electrical device attachment tab 24. Turning to FIGS. 1A-2B, the snap in zip connector 30 may be configured to couple with an aperture 22 that extends through the inner surface 26 and the outer surface 28 of the electrical box 20. The electrical wire 10 extends through and is gripped by the snap in zip connector 30, as will be disclosed in more detail below. The snap in zip connector 30 comprises a clamp 40, at least one fastener 70, at least one insert 90, and may optionally comprise a collar 80. The clamp 40 may comprise a first bracket member 50 and a second bracket member 60.

Figure 3:
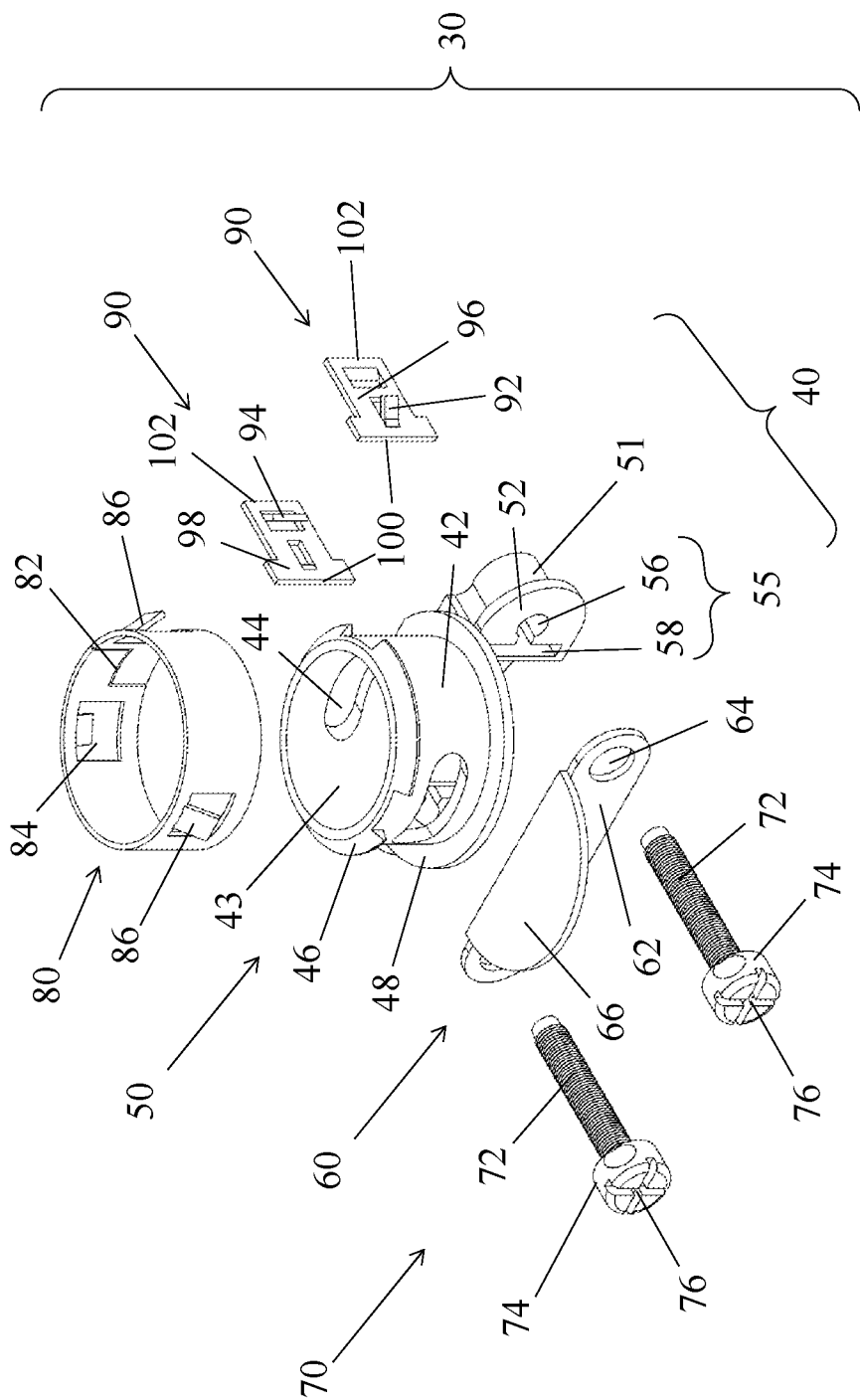
FIG. 3 is an exploded view of the snap in zip connector shown in FIG. 2A.

Turning to FIG. 3, the clamp 40 is configured to grip the electrical wire 10. The first bracket member 50 has an upper rim 46, a lower rim 48, a pipe 42 extending between the upper rim 46 and the lower rim 48, and a clamp seat 51 fixedly coupled to the pipe 42 adjacent to the lower rim 48. The upper rim 46 is configured to be disposed adjacent to the outer surface 28 of the electrical box 20 and the lower rim 48 is configured to be disposed adjacent to the inner surface 26 of the electrical box 20 when the snap in zip connector 30 is coupled with the aperture 22 of the electrical box 20 (see FIG. 1A). The terms "upper" and "lower" for various elements shown and described with respect to FIG. 3 and throughout this disclosure may be reversed in other views and in other applications, and are provided by way of illustration and not by limitation. The pipe 42 has a sidewall 43 with an opening 44 extending through the sidewall 43. The clamp seat 51 has a first surface 52, a second surface 54 opposite the first surface 52, and at least one first fastener opening 55 extending through the first surface 52 and the second surface 54. The at least one first fastener opening 55 comprises an elongated slot 58 and a circular hole 56 positioned adjacent to each other. The elongated slot 58 and the circular hole 56 are joined together to form the at least one first fastener opening 55. While the drawings and the description generally describe the hole 56 as being circular, any other shape for the hole 56 would also work and is considered an equivalent of the circular hole 56 as herein disclosed.

The second bracket member 60 is positioned adjacent to the first surface 52 of the clamp seat 51. The second bracket member 60 has at least one second fastener opening 64 extending through the second bracket member 60. The at least one second fastener opening 64 is aligned with the circular hole 56 of the at least one first fastener opening 55 of the clamp seat 51. As shown in FIGS. 2A-9, the at least one fastener 70 extends through the at least one first fastener opening 55 and the at least one second fastener opening 64. In some embodiments, the at least one first fastener opening 55 and the at least one second fastener opening 64 may be unthreaded. The at least one fastener 70 has a threaded shaft 72, and may have a head 74 with a drive 76. In some embodiments, and as shown in the FIGs., the at least one fastener 70 is two fasteners 70, the at least one first fastener opening 55 is two first fastener openings 55, the at least one second fastener opening 64 is two second fastener openings 64, and the at least one insert 90 is two inserts 90. In embodiments with two second fastener openings 64, the second bracket member 60 has a bridging member 62 in between the two second fastener openings 64. The second bracket member 60 may also comprise a ledge 66, which may be perpendicular to the face of the second bracket member 60 that comprises the openings 64.

Figure 4A:
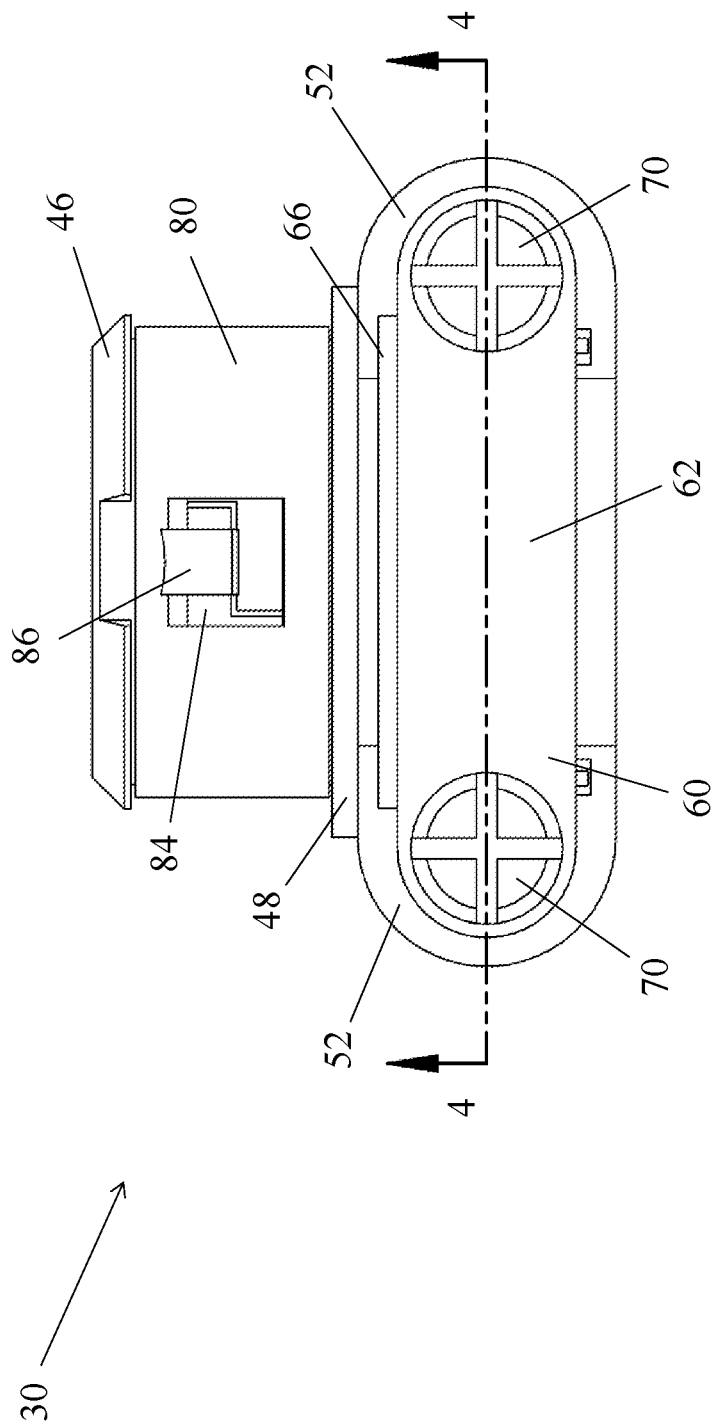
FIG. 4A is a front view of the snap in zip connector shown in FIG. 2A.
Figure 4B:
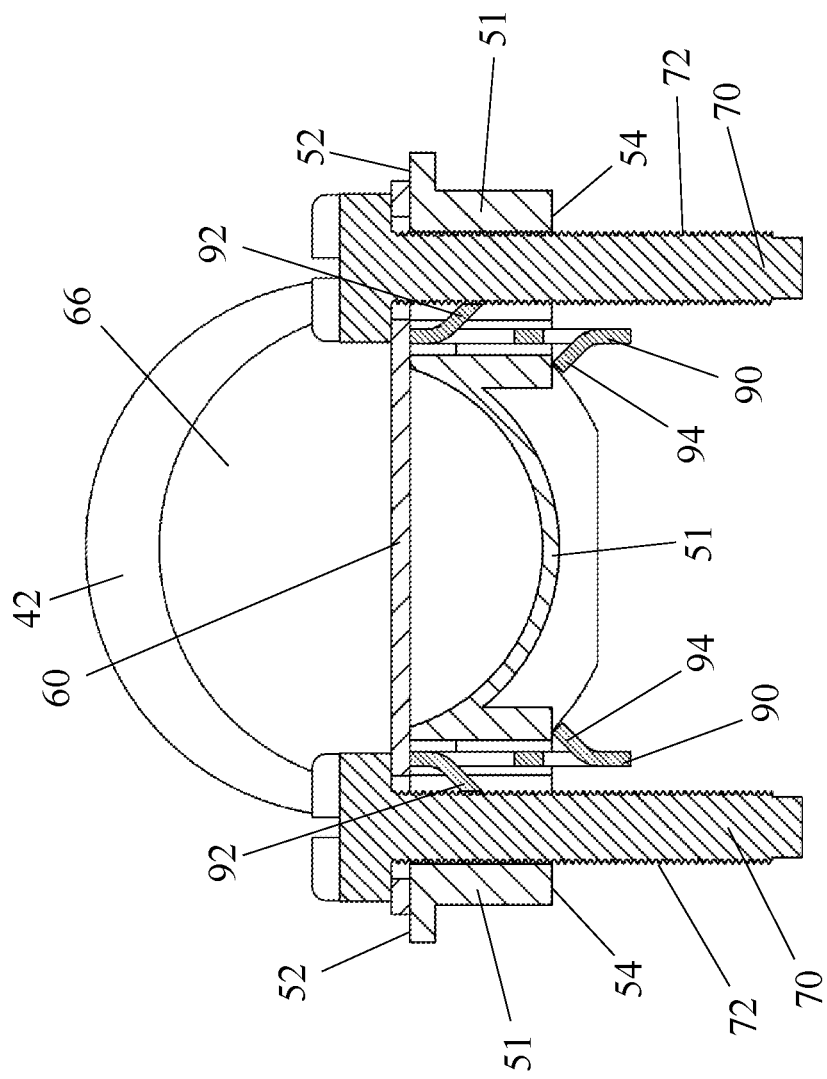
FIG. 4B is a cross section view of the snap in zip connector shown in FIG. 4A, taken along line 4-4.
Figure 5:
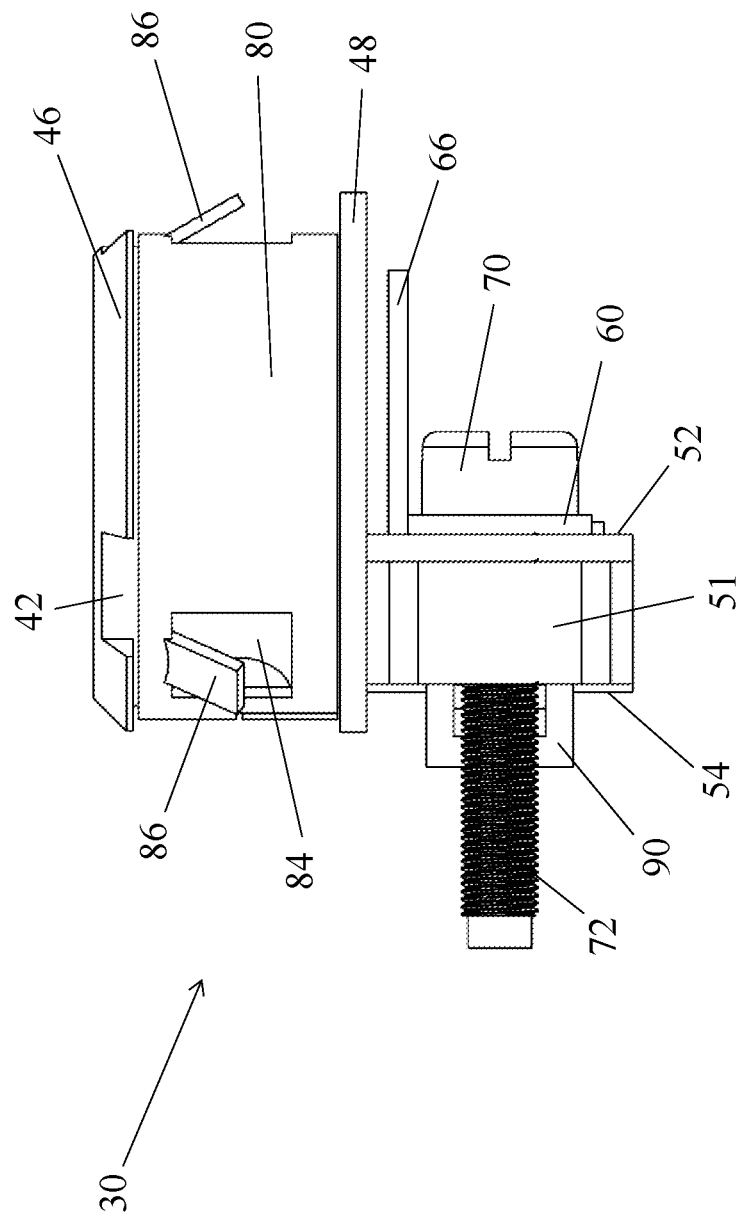
FIG. 5 is a left side view of the snap in zip connector shown in FIG. 1A.
Figure 6:
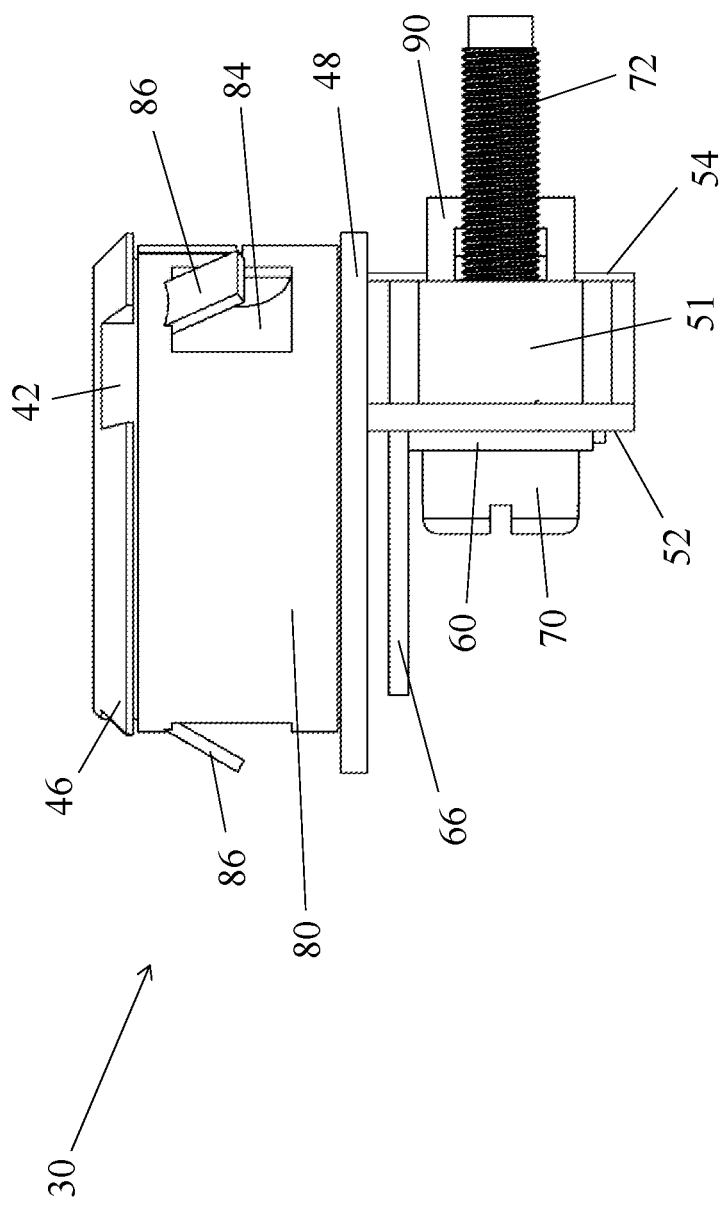
FIG. 6 is a right side view of the snap in zip connector shown in FIG. 1A.
Figure 7:
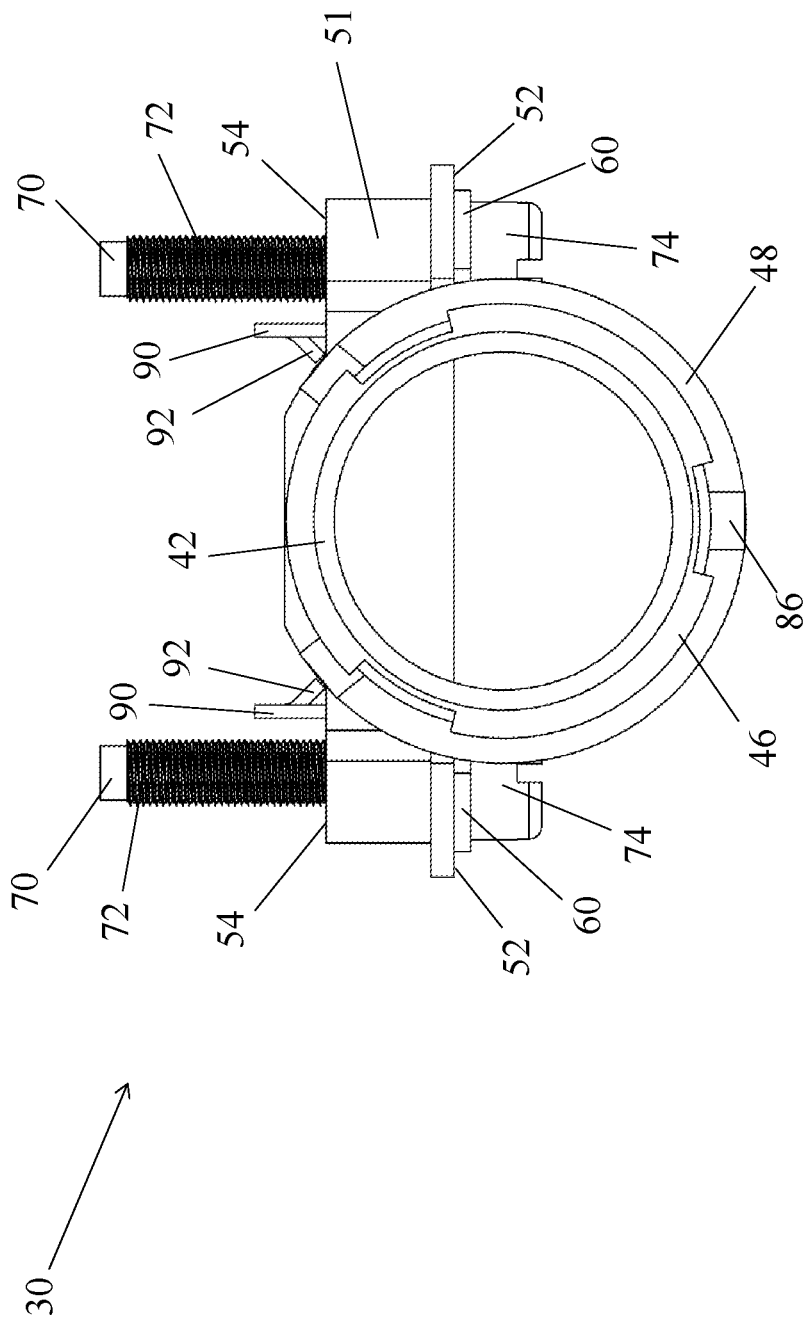
FIG. 7 is a top view of the snap in zip connector shown in FIG. 1A.
Figure 8:
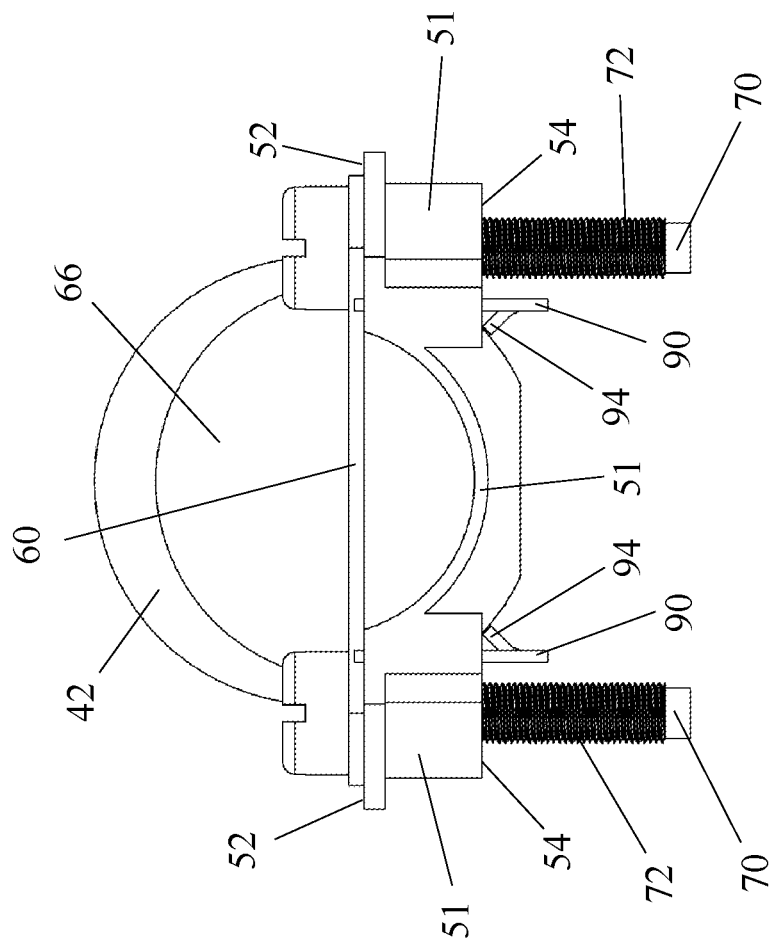
FIG. 8 is a bottom view of the snap in zip connector shown in FIG. 1A.
Figure 9:
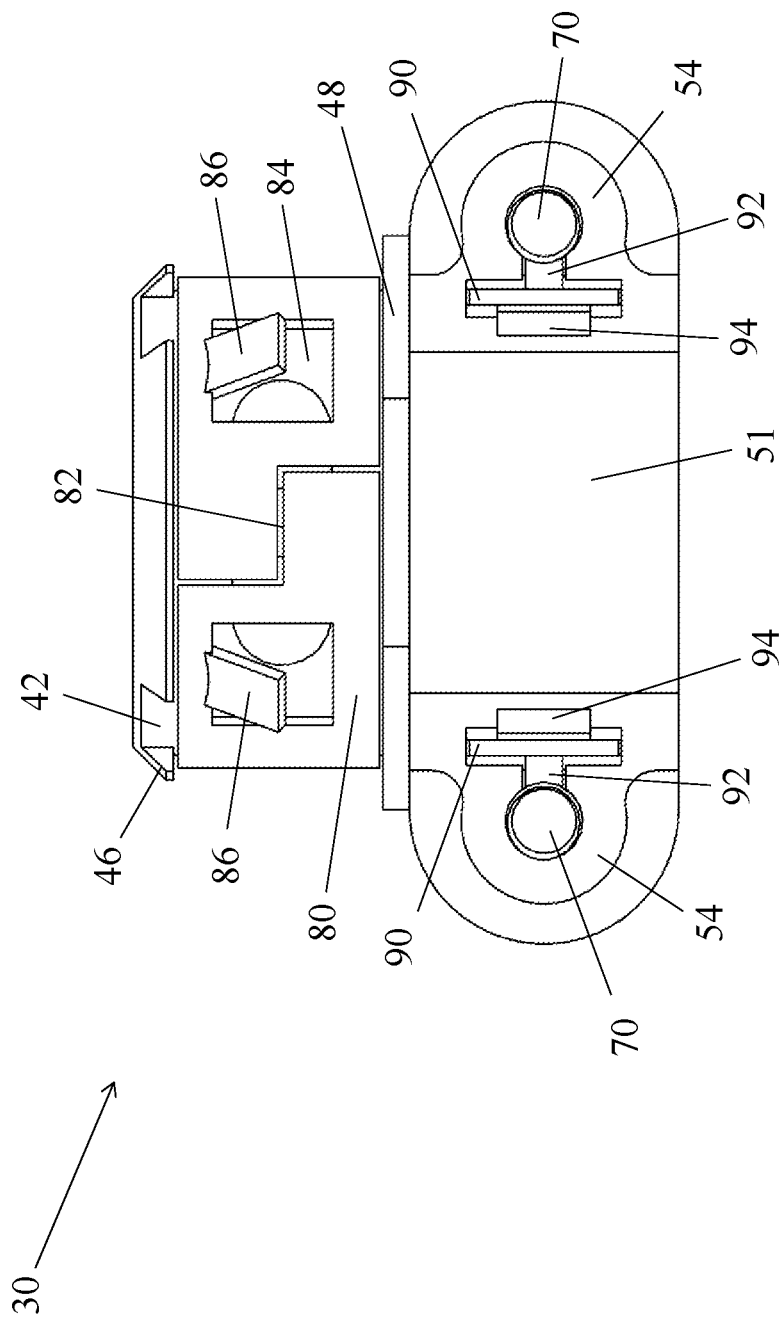
FIG. 9 is a back view of the snap in zip connector shown in FIG. 1A.
Figure 10:
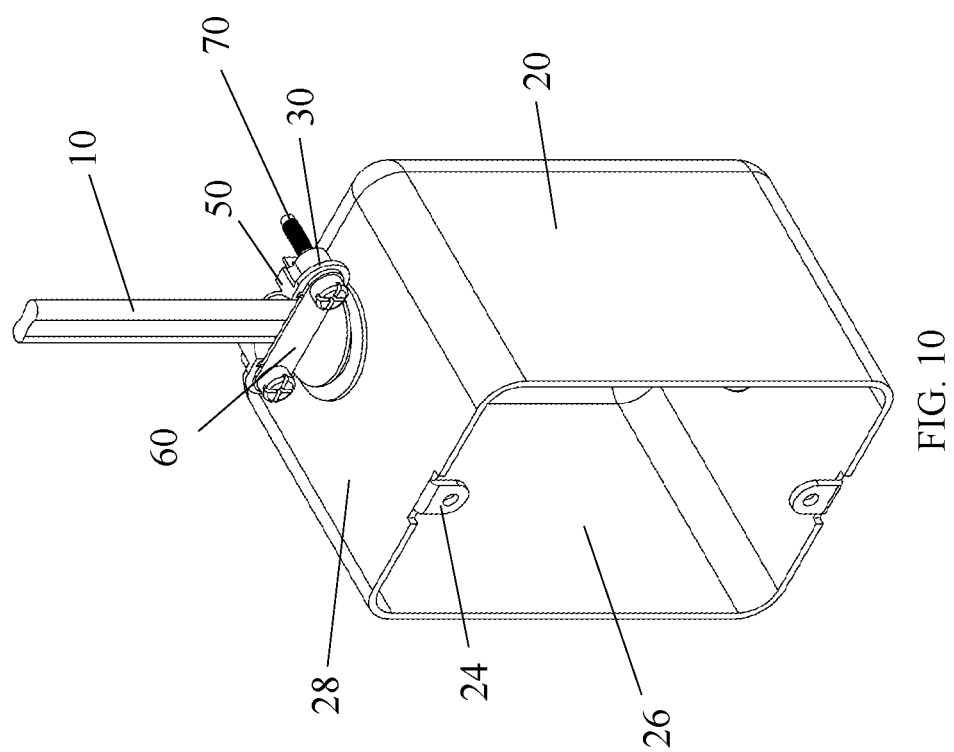
FIG. 10 is a front perspective view of the snap in zip connector shown in FIG. 1A installed in an electrical box and coupled with an electrical wire.
Figure 11:
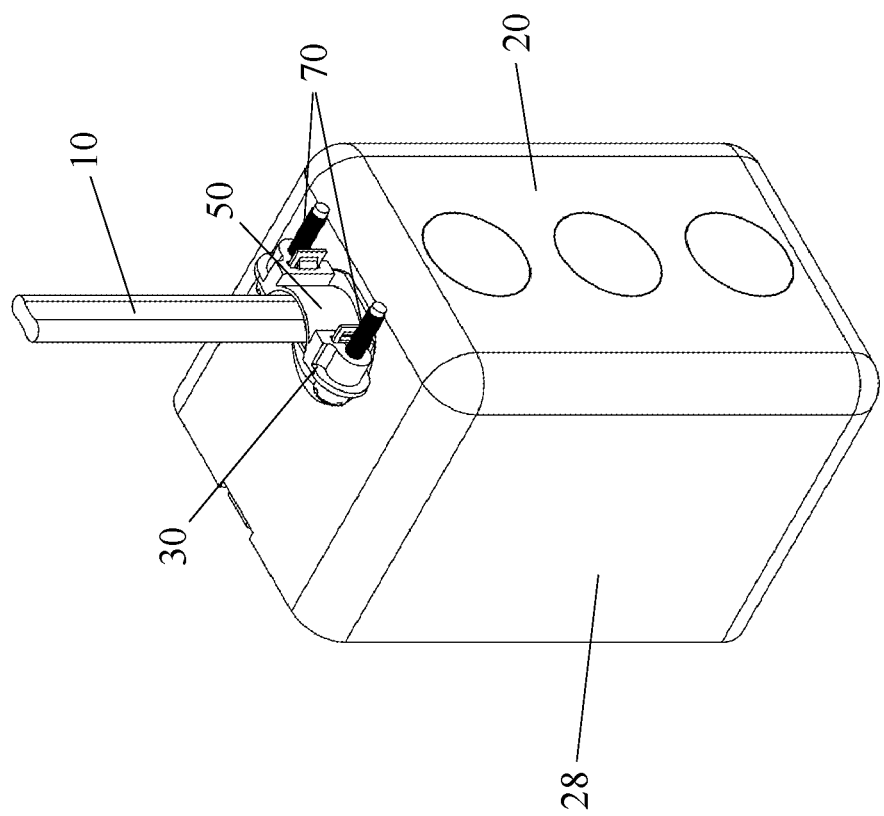
FIG. 11 is a back perspective view of the snap in zip connector shown in FIG. 1A installed in an electrical box and coupled with an electrical wire.
Figure 12:
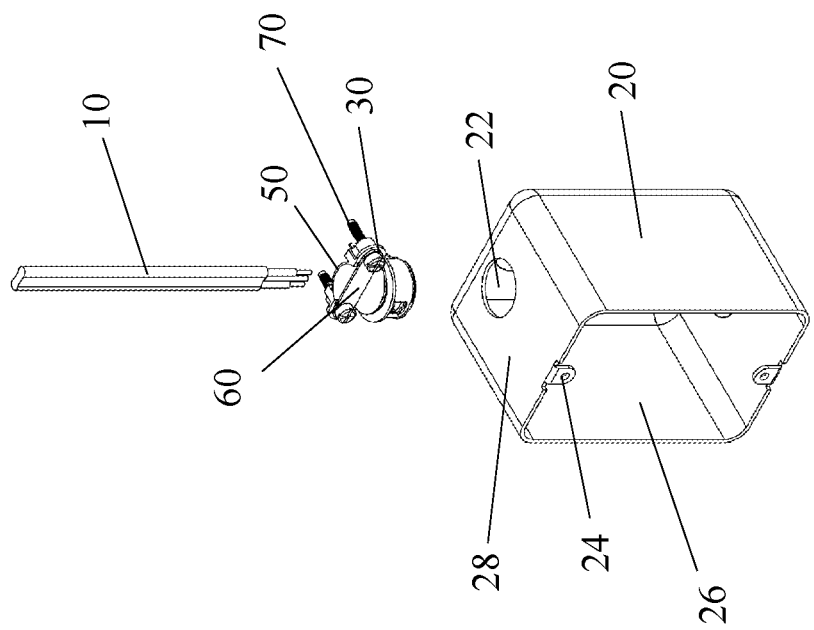
FIG. 12 is a front perspective view of the snap in zip connector shown in FIG. 1A with an electrical box and an electrical wire.
Figure 13:
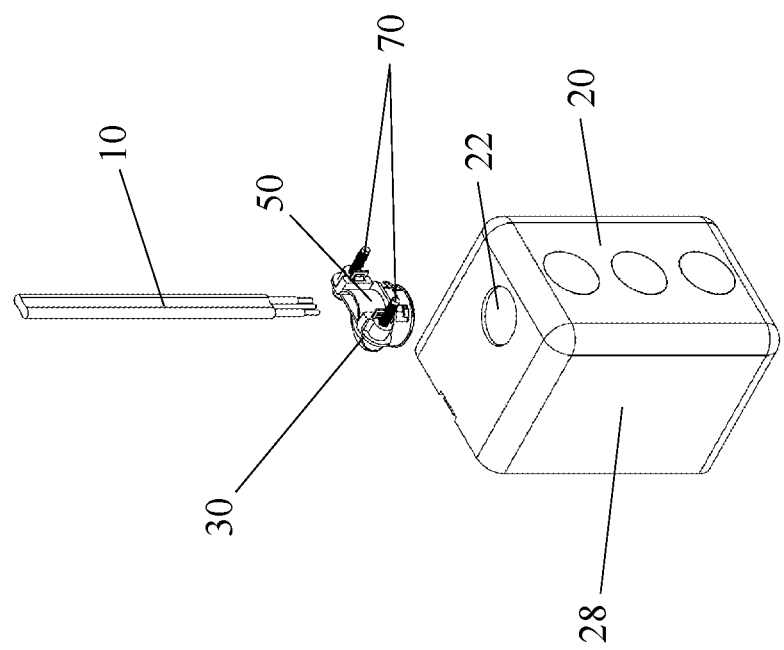
FIG. 13 is a back perspective view of the snap in zip connector shown in FIG. 1A with an electrical box and an electrical wire.

Turning to FIGS. 4A and 4B, the at least one insert 90 is configured to be positioned within the elongated slot 58 of the first bracket member 50. When the at least one insert 90 is positioned within the elongated slot 58, the at least one insert 90 also extends through the second surface 54 of the clamp seat 51. The at least one insert 90 has a spring arm 92 on a first side 96 of the at least one insert 90, extending way from the at least one insert 90 at an angle. The spring arm 92 extends into the circular hole 56 when the at least one insert 90 is positioned within the elongated slot 58. The spring arm 92 is configured to flex in relation to the at least one fastener 70 inserted into the circular hole 56, engage with the threaded shaft 72, and impede the removal of the at least one fastener 70 from the circular hole 56. Because of the angle of the spring arm 92, the spring arm 92 flexes over the threads on the threaded shaft 72 when the at least one insert 90 is moved closer to the head 74 of the at least one fastener 70, but locks into the threads of the threaded shaft 72 when a force away from the head 74 of the at least one fastener 70 is applied to the at least one insert 90. In this manner, the at least one fastener 70 can be quickly coupled with the at least one insert 90 within the at least one first fastener opening 55 without requiring any rotation of the at least one fastener 70, thus saving time in rotating the fastener 70. The user may tighten the at least one fastener 70 further, by using a screwdriver in conjunction with the drive 76 of the at least one fastener 70 to rotate the at least one fastener 70, allowing the spring arm 92 to act as a thread and tighten the at least one fastener 70 further. The at least one fastener 70 may be loosened in the same manner, by rotating the at least one fastener 70.

The at least one insert 90 may also have a stop 94 on a second side 98 opposite the first side 96. The stop 94 is configured to contact the second surface 54 of the clamp seat 51, and thus restrict the at least one insert 90 from completely entering the elongated slot 58. Thus, the spring arm 92 is nearest a leading edge 100 of the at least one insert 90, while the stop 94 is nearest a trailing edge 102 of the at least one insert 90. The stop 94 and the spring arm 92 thus hold the clamp 40 together and allows the clamp 40 to grip the electrical wire 10, as further shown in FIGS. 10-13.

Returning to FIGS. 2B and 3, the snap in zip connector 30 may also comprise a collar 80. The collar 80 extends around the pipe 42 of the first bracket member 50, and is retained on the first bracket member 50 by the upper rim 46 and the lower rim 48. The collar 80 may have at least one tab 86 extending away from the collar 80. The at least one tab 86 is configured to engage with the electrical box 20 to lock the snap-in zip connector 30 to the electrical box 20. The collar 80 may also have a gap 82 for opening and closing the collar 80 around the pipe 42. The gap 82 may include a stair-step or jogged configuration. The collar 80 may further have at least one opening 84 through collar 80, such as three openings 84 or any suitable number, the openings extending from an inner surface of the collar 80 to the outer surface of the collar 80.

It will be understood that implementations of a snap in zip connector are not limited to the specific assemblies, devices and components disclosed in this document, as virtually any assemblies, devices and components consistent with the intended operation of a snap in zip connector may be used. Accordingly, for example, although particular snap in zip connectors, and other assemblies, devices and components are disclosed, such may include any shape, size, style, type, model, version, class, measurement, concentration, material, weight, quantity, and/or the like consistent with the intended operation of snap in zip connectors. Implementations are not limited to uses of any specific assemblies, devices and components; provided that the assemblies, devices and components selected are consistent with the intended operation of a snap in zip connector.

Accordingly, the components defining any snap in zip connector may be formed of any of many different types of materials or combinations thereof that can readily be formed into shaped objects provided that the materials selected are consistent with the intended operation of a snap in zip connector. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various snap in zip connectors may be manufactured using conventional procedures as added to and improved upon through the procedures described here. Some components defining a snap in zip connector may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g.

a bolt, a nut, a screw, a nail, a rivet, a pin, and/or the like), wiring, any combination thereof, and/or the like for example, depending on, among other considerations, the particular material forming the components.

It will be understood that methods for manufacturing or assembling snap in zip connectors are not limited to the specific order of steps as disclosed in this document. Any steps or sequence of steps of the assembly of a snap in zip connector indicated herein are given as examples of possible steps or sequence of steps and not as limitations, since various assembly processes and sequences of steps may be used to assemble snap in zip connectors.

The implementations of a snap in zip connector described are by way of example or explanation and not by way of limitation. Rather, any description relating to the foregoing is for the exemplary purposes of this disclosure, and implementations may also be used with similar results for a variety of other applications employing a snap in zip connector.

What is claimed is:

1. A clamp configured to grip an electrical wire, comprising:
    a first bracket member with at least one first fastener opening extending through the first bracket member;
    a second bracket member with at least one second fastener opening extending through the second bracket member;
    at least one fastener having a threaded shaft configured to extend through the at least one first fastener opening and the at least one second fastener opening; and
    at least one insert configured to be positioned within the at least one first fastener opening and engage with the at least one fastener when the at least one fastener extends through the at least one first fastener opening;
    wherein when the at least one insert is positioned within the at least one first fastener opening, the at least one fastener is slidable past the at least one insert into the at least one first fastener opening and removal of the at least one fastener from the at least one first fastener opening is restricted except through rotation of the at least one fastener.

2. The clamp of claim 1, the at least first fastener opening comprising an elongated slot and a circular hole joined together, wherein the at least one fastener is configured to extend through the circular hole and the at least one insert is configured to be positioned within the elongated slot.

3. The clamp of claim 1, the at least one insert having an arm configured to engage with the at least one fastener when the at least one fastener extends through the at least one first fastener opening.

4. The clamp of claim 1, the at least one insert having a stop configured to contact the first bracket member and restrict the at least one insert from completely entering the at least one first fastener opening.

5. The clamp of claim 1, the first bracket member further having a pipe extending between an upper rim and a lower rim and at least one tab extending away from the pipe, wherein when the clamp grips the electrical wire, the electrical wire extends through the pipe.

6. The clamp of claim 5, further comprising an electrical box, wherein the upper rim is disposed adjacent an outer surface of the electrical box, the lower rim is disposed adjacent an inner surface of the electrical box, and the at least one tab is engaged with the electrical box to lock the pipe to the electrical box.

7. A clamp configured to grip an electrical wire, comprising:
    a bracket member with at least one fastener opening extending through the bracket member;
    at least one fastener having a threaded shaft configured to extend through the at least one fastener opening; and
    at least one insert configured to be positioned within the at least one fastener opening and engage with the at least one fastener when the at least one fastener extends through the at least one fastener opening;
    wherein when the at least one insert is positioned within the at least one fastener opening, the at least one fastener is slidable past the at least one insert into the at least one fastener opening and removal of the at least one fastener from the at least one fastener opening is restricted except through rotation of the at least one fastener.

8. The clamp of claim 7, the at least fastener opening comprising an elongated slot and a circular hole joined together, wherein the at least one fastener is configured to extend through the circular hole and the at least one insert is configured to be positioned within the elongated slot.

9. The clamp of claim 7, the at least one insert having an arm configured to engage with the at least one fastener when the at least one fastener extends through the at least one fastener opening.

10. The clamp of claim 7, the at least one insert having a stop configured to contact the bracket member and restrict the at least one insert from completely entering the at least one fastener opening.

11. The clamp of claim 7, wherein the at least one fastener opening is unthreaded.

12. The clamp of claim 7, the bracket member further having a pipe extending between an upper rim and a lower rim and at least one tab extending away from the pipe, wherein when the clamp grips the electrical wire, the electrical wire extends through the pipe.

13. The clamp of claim 12, further comprising an electrical box, wherein the upper rim is disposed adjacent an outer surface of the electrical box, the lower rim is disposed adjacent an inner surface of the electrical box, and the at least one tab is engaged with the electrical box to lock the pipe to the electrical box.

14. A clamp configured to grip an electrical wire, comprising:
    a bracket member with at least one fastener opening extending through the bracket member;
    at least one fastener having a shaft configured to extend through the at least one fastener opening; and
    at least one insert configured to engage with the at least one fastener when the at least one fastener extends through the at least one fastener opening;
    wherein the at least one fastener is slidable into the at least one fastener opening and wherein when the at least one insert is engaged with the at least one fastener, removal of the at least one fastener from the at least one fastener opening is restricted except through rotation of the at least one fastener.

15. The clamp of claim 14, the at least fastener opening comprising an elongated slot and a circular hole joined together, wherein the at least one fastener is configured to extend through the circular hole and the at least one insert is configured to be positioned within the elongated slot.

16. The clamp of claim 14, the at least one insert having an arm configured to engage with the at least one fastener when the at least one fastener extends through the at least one fastener opening.

17. The clamp of claim 14, the at least one insert having a stop configured to contact the bracket member and restrict the at least one insert from completely entering the at least one fastener opening.

18. The clamp of claim 14, wherein the at least one fastener opening is unthreaded.

19. The clamp of claim 14, the bracket member further having a pipe extending between an upper rim and a lower rim and at least one tab extending away from the pipe, wherein when the clamp grips the electrical wire, the electrical wire extends through the pipe.

20. The clamp of claim 19, further comprising an electrical box, wherein the upper rim is disposed adjacent an outer surface of the electrical box, the lower rim is disposed adjacent an inner surface of the electrical box, and the at least one tab is engaged with the electrical box to lock the pipe to the electrical box.

* * * * *